July 10, 1951          J. DE SWART          2,559,759
GROMMET
Filed Oct. 22, 1945
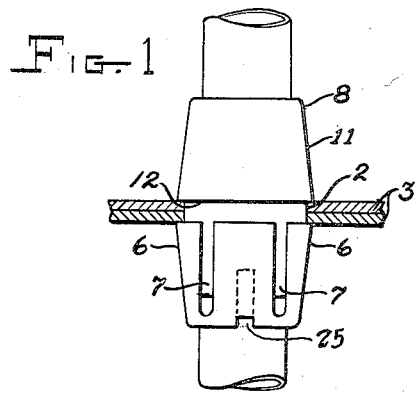
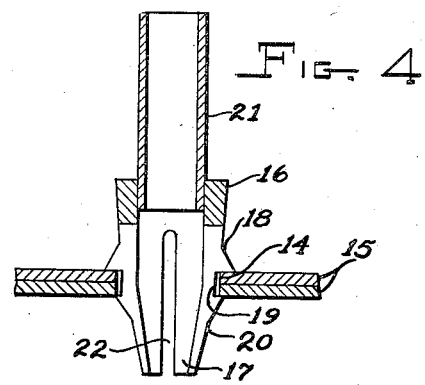
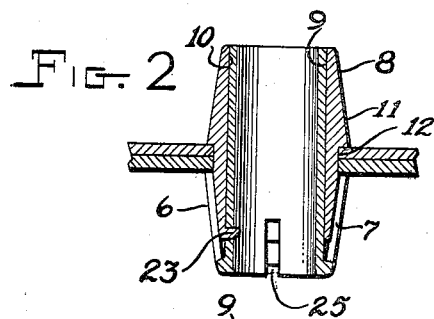
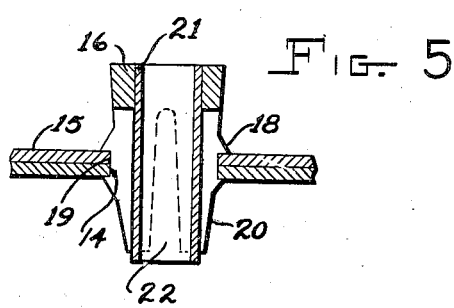
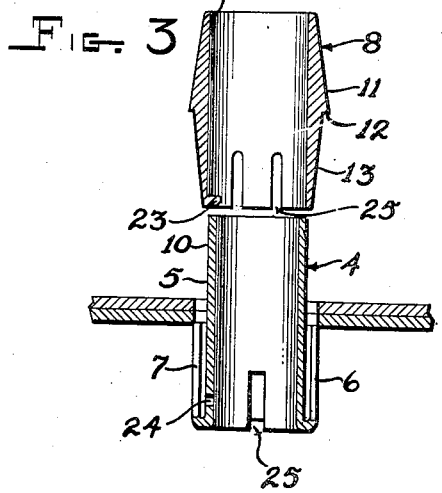
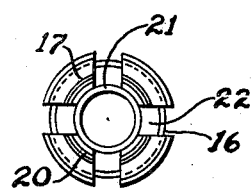
INVENTOR.
Jan De Swart
BY Lyon & Lyon
ATTORNEYS Patented July 10, 1951

2,559,759

UNITED STATES PATENT OFFICE 2,559,759

GROMMET

Jan de Swart, Los Angeles, Calif., assignor, by mesne assignments, to Illinois Tool Works, Chicago, Ill., a corporation of Illinois Application October 22, 1945, Serial No. 623,809

2 Claims. (Cl. 16—2)

This invention relates to a grommet, and is particularly intended to provide a grommet of the type for use in connection with metal bodies, such as the metal bodies of aircraft.

Previous to the present invention, grommets have usually been made out of rubber, but by the use of materials which are generally referred to in the industry as plastics, I have found that superior grommets may be produced which serve also some of the advantages of rivets in holding metal plates together, where the body is formed of more than a single metal plate.

A further object of the present invention is to so construct a plastic grommet that it may be inserted from one side only of the opening and which is expandable to and will positively lock the grommet from displacement in the opening.

The present invention will be more fully understood from the following description of the preferred embodiments or examples of grommets embodying the invention. For this purpose I have hereafter described the preferred form of the invention in connection with the accompanying drawing, in which Figure 1 is a side view, showing the grommet installed in position.

Figure 2 is a vertical section.

Figure 3 is a vertical section of the two members of the grommet in the act of installing the same.

Figure 4 is a vertical section of a modified form of grommet being installed in position, with openings through two metal sheets.

Figure 5 is a similar view in the final position of the grommet.

Figure 6 is a bottom view of the grommet.

Referring to the drawing, I have indicated a grommet in Figures 1, 2 and 3 which is being installed in an opening 2 in a metal sheet 3. The grommet includes an inner member 4 consisting of the tube 5 and a shorter tube 6, which tube 6 joins the tube 5 at the lower end of the member. The tube 6 may taper so as to expand upwardly when it is produced, or may be cylindrical, as shown. The tube 6 has slots 7 leading from its upper end to nearly the lower end of the tube, which slots 7 permit the upper end of the tube 6 to be expanded and contracted in operation.

The grommet also includes a wedging member 8 which consists of a plastic tube having an inner diameter 9 adapted to have a sliding fit with the outer diameter 10 of the tube 5. The member 8 is enlarged at its center and tapered to contract upwardly, as shown at 11, above a shoulder 12. Below the shoulder 12 the outer surface of the member 8 tapers to contract downwardly.

In operation of the grommet thus described, the member 4 is first inserted from the upper side of the plate 3, as viewed in the figures, until the upper edge of the tubular portion 6 of that member is below the plate 3. The member 8 is then inserted over the member 4. The tapered portion 13 of the member 8 wedges between the tubes 6 and 5 of the member 4, as indicated more particularly in Figure 2, and expands the upper end of the tube 6 so as to bring the upper edge of the tube 6 into position to contact with and lock against the plate 3. In this position the grommet cannot be extruded from the plate 3 until the members 8 and 4 are subjected to some relative movement. This relative movement between said members is strongly resisted by the extensive friction surfaces provided by each. The grommet is formed of a suitable plastic, for example, cellulose acetate or like material of the class commonly described in modern industry under the general term plastics. The plastic composition of the grommet serves as an excellent insulation and the grommet provides a suitable opening for either electrical conduit wires or any other control connections being made through the machine.

Now referring more particularly to the form of the invention shown in Figures 4, 5 and 6, in this case I have indicated the devices as installed in openings 14 of two sheets 15 of metal. The grommet is again entirely composed of plastic material and consists of a member having a ring 16 below which extends a plurality of tongues 17, each tongue 17 having an enlargement 18 at the center forming a groove 19 for the reception of the metal sheets 15. Below the groove 19 the tongues 17 have tapered surfaces, indicated at 20. The grommet also includes a short section of simple cylindrical tubing 21. The tube 21 has an outer diameter such as to have a sliding fit with the inner diameter of the ring 16 and is of a length sufficient to extend from the ring 16 throughout the length of the tongues 17.

In operation of the grommet shown in Figures 4, 5 and 6, the tongues 17 are inserted in the openings 14 between the sheets and are adapted to be compressed together at their lower ends, due to the slits 22 between the tongues, so that they may be contracted sufficiently to allow the lower ends of the tongues to pass through the openings in the sheets of metal 15 to be received in the grooves 19 in the tongues. In this position the tongues are tapered inwardly. The tube 21 is then driven down between the tongues which expands the tongues sufficiently to thoroughly lock the plates 15 in the grooves 19 so that the grommet cannot be extruded from the opening until relative movement between the tube 21 and the rings 16.

I have found that at times the wedging member 8 and the tube 5 do not have sufficient friction therebetween to permanently anchor the grommet in position. As a modification of my invention, and to overcome any tendency of these parts to separate, a projection 23 can be added to the wedging member 8 which extends inwardly and a slot 24 can be provided in the tube 5 to permit the projection 23 to ride up and over the tube 5 and fall into the slot 24; I prefer to slit the tube forming the tube 5 and the wedge member 8 as shown at 25.

While the forms of the grommet herein described are well adapted to carry out the objects of this invention, it is to be understood that various modifications and changes may be made, and in this invention are included all such modifications and changes as come within the scope of the appended claims.

I claim:

1. A self-locking grommet comprising a body member having a cylindrical outer surface and an integral outer split skirt connected at the end of said body member and overlying said cylindrical outer surface thereof, said skirt being axially rigid and the free edges thereof forming an abutment shoulder adapted to be positioned in engaging relation with one side of the wall when the grommet is arranged in clamping position in an apertured wall; a clamping outer sleeve axially slidable over said cylindrical outer surface of said body member in frictional engagement therewith and including a tapered end portion adapted to enter between said skirt and said cylindrical outer surface to expand said skirt, an exterior abutment shoulder intermediate the ends of said outer sleeve adapted to engage the opposite face of said wall, said tapered end being slit to divide the same into a plurality of tongues, a locking projection on one of said tongues and said body member having a slot for receiving said locking projection to permanently lock the members together when said tapered end is wedged within said skirt.

2. A clamping grommet adapted to extend into an opening in a wall in clamping relation with said wall, said grommet comprising a pair of telescoping sleeve-like members, the inner member having a cylindrical external surface and an integral outer skirt formation extending inwardly of one end in overlying relation to said external surface, said skirt formation being characterized by peripherally spaced slits in its free end dividing the same into a plurality of tongues and said tongues being relatively rigid in the direction axially of the sleeve member for engagement in abutting relation with one side of said wall, the outer member having a shoulder on the outer surface adapted for engagement in abutting relation with the other side of said wall and a tapered end adapted to wedge between said skirt formation and said external cylindrical surface of said inner member to expand said skirt formation, said tapered end being slotted to provide a tongue thereon, a laterally extending locking projection on said tongue, said inner member having a locking slot adjacent the skirted end for receiving said locking projection when said members are in telescoped relation and said tapered end is wedged between said skirt formation and said external surface of the inner member.

JAN DE SWART.

REFERENCES CITED

The following references are of record in the file of this patent:

UNITED STATES PATENTS

| Number | Name | Date |
| --- | --- | --- |
| 89,708 | Tuthill | May 4, 1869 |
| 1,987,035 | Tideman | Jan. 8, 1935 |
| 2,099,678 | Curtis | Nov. 23, 1937 |
| 2,115,495 | Mapelsden | Apr. 26, 1938 |
| 2,255,971 | Hall | Sept. 16, 1941 |
| 2,365,785 | Tinnerman | Dec. 26, 1944 |

FOREIGN PATENTS

| Number | Country | Date |
| --- | --- | --- |
| 206,275 | Great Britain | Nov. 8, 1923 |

OTHER REFERENCES

Modern Plastics, page 106, Dec. 1944.